July 4, 1961 R. K. TYRA 2,990,600
APPARATUS FOR MAKING TILE AND CULVERTS
Filed May 20, 1957 2 Sheets-Sheet 2
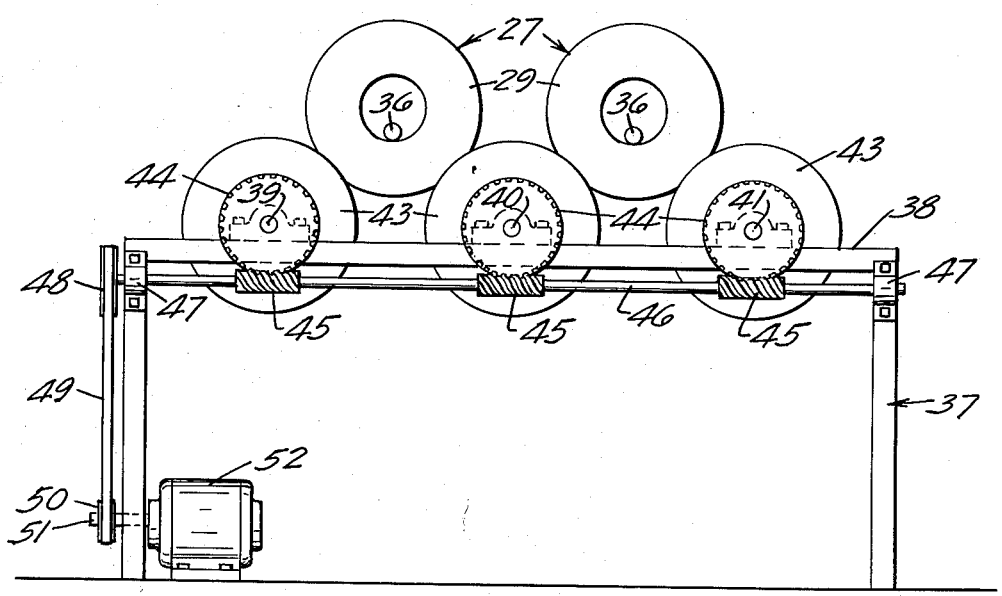
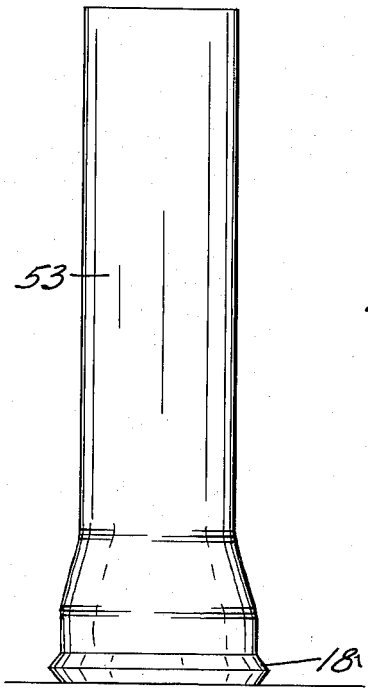
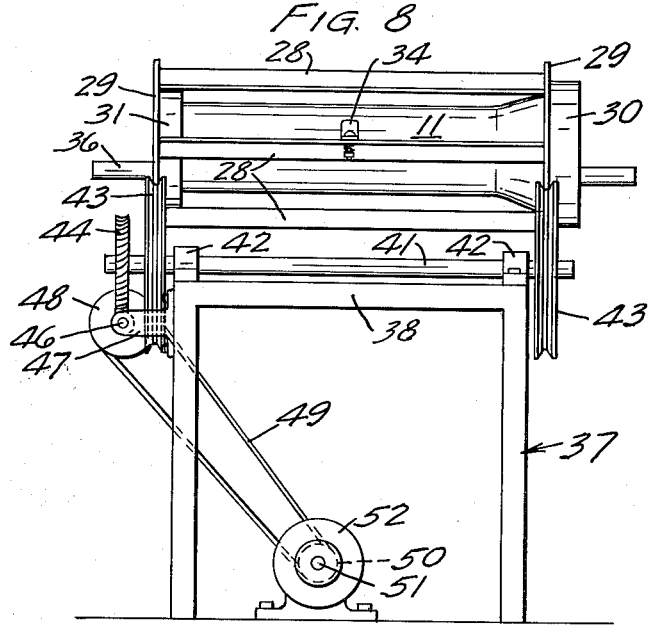
INVENTOR.
RUDOLPH K. TYRA
BY
Williamson, Schroeder, Adams & Meyers
ATTORNEYS

United States Patent Office 2,990,600
Patented July 4, 1961

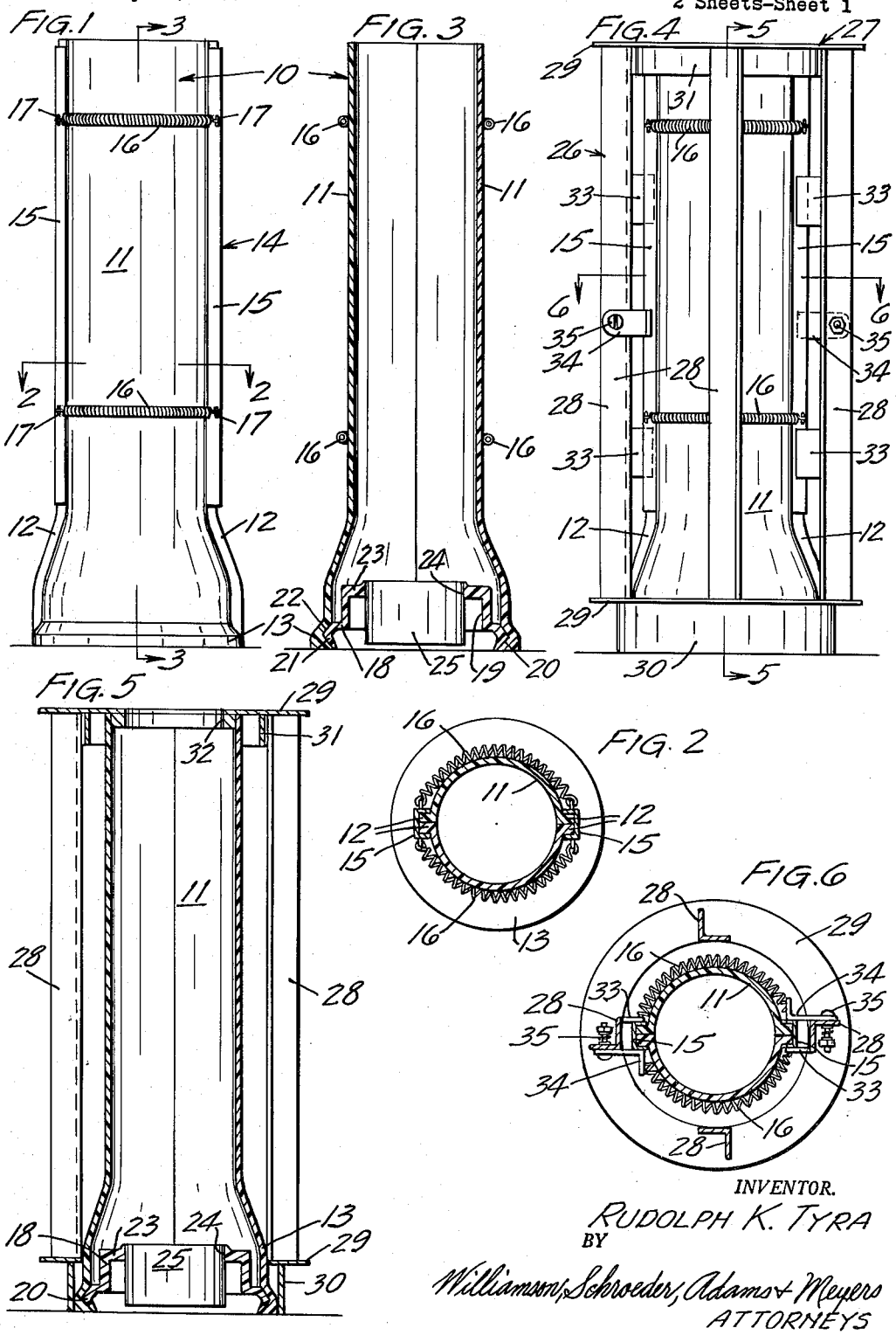

2,990,600
APPARATUS FOR MAKING TILE AND CULVERTS
Rudolph K. Tyra, Wyoming, Minn.
Filed May 20, 1957, Ser. No. 660,252
6 Claims. (Cl. 25—30)

This invention relates to apparatus for making tile and culverts, and more particularly to a special machine and mold construction adapted to make concrete pipe or cylinder products such as tile and culverts.

Non-metallic products such as tile and culverts are usually made either of ceramic clay or of concrete. The clay products are extruded or otherwise formed in wet condition and then are dried and baked in a kiln. The resultant products may be provided with glazed surfacing or may be left dull and porous. The preparing, drying and firing of the clay products requires special equipment, and skilled treatment which may render the products expensive and difficult to standardize. Cementitious tile and culverts are quite competitive with the same clay products in cost as well as in performance. Unfortunately, however, the expensive molds which are tied up in production during the molding and initial setting period requires a high capital investment in the concrete culvert and tile business. Expensive individual molds must be supplied in large quantities to permit adequate forming and curing of the conventional concrete products before stripping from the mold. Steam curing or autoclaving the cement products will speed up the production somewhat but the required number of expensive molds is still large and represents a considerable investment for the ordinary manufacturer of such concrete products. The general nature of the concrete product business is such as to make uneconomical the use of expensive molds in an intermittent or small scale operation. The problem is intensified by the fact that it is difficult to avoid a certain percentage of defective products which must be rejected because of cracks or pits which are not evident until the product is removed from the mold. Each such defective product has not only wasted the material and labor cost allocated to it, but also has monopolized the individual mold equipment and has prevented the productive use thereof during the time which elapsed from the assemblage of the mold to the stripping of the mold from the product.

It is an important object of the present invention to minimize the above noted difficulties and to provide apparatus for economical and easy manufacture of cementitious tubular or cylindrical products such as tile and culverts.

Another object is to provide a coreless mold device which can be rotated in relative cooperation with roller means to shape hollow cementious products prior to the setting of the cement.

A further object of the invention is to provide special sectional mold construction wherein portions thereof can be economically used for multiple castings prior to the setting of the cement material utilized.

A still further object of the invention is to provide molding apparatus for cast products of the class described wherein the composite parts can be quickly and economically assembled and dissembled without the aid of screws, bolts or other conventional fasteners.

These and other objects and advantages of the invention will more fully appear from the following description, made in connection with the accompanying drawings, wherein like reference characters refer to the same parts throughout the several views and in which:

FIGURE 1 is a side elevation of my multi-sectioned mold in assembled and clamped condition;

FIGURE 2 is a cross section taken on the line 2—2 of FIGURE 1;

FIGURE 3 is a vertical section taken on the line 3—3 of FIGURE 1;

FIGURE 4 is a side elevation of the mold interfitted with the cage to form a braced unit;

FIGURE 5 is a vertical section taken on the line 5—5 of FIGURE 4;

FIGURE 6 is a horizontal cross section taken on the line 6—6 of FIGURE 4;

FIGURE 7 is a schematic representation of a machine having trunnion drive means supporting and rotating a pair of my braced forms during the molding of concrete products therein;

FIGURE 8 is an end view of the apparatus shown in FIGURE 7 and taken from the right thereof; and FIGURE 9 is a finished cast culvert member resting on its pallet after removal of the mold shells.

With continued reference to the drawings, FIGURE 1 shows the separable multi-sectioned mold clamped in assembled relation and ready for introduction of a charge of freshly prepared setting material such as hydraulic cement or concrete. The mold is indicated generally at 10 and comprises a plurality of sections 11 constructed of thin and light material such as reinforced plastic having high strength and being selected for ready separability from the particular setting material to be molded. In the instant case, there are two shells 11, each symmetrical and presenting a semi-circular concavity which will produce a tile or a culvert of generally cylindrical shape. Each of the sections 11 is provided with a side flange or rib 12 at oppositely disposed sides which acts both as a reinforcing piece and as means for fastening the sections together in aligned relationship. The form shown also provides a bell-shaped end 13 for producing a connecting shoulder on the finished culvert member as will be subsequently described. The flanges 12 are placed together as shown in FIGURE 2, and the clamp means 14 is applied to the flanges to interlock the flanges and sections into a unitary assembled mold. The clamp means 14 includes a pair of elongated channel irons 15 which snugly fit over the mated flanges 12, as shown in FIGURE 2. Interconnecting tension springs 16 secure the opposed channel irons 15 against the multi-sectioned mold and also assist in holding the sections in abutting relation. The tension springs 16 are secured across pairs of channel irons 15 at the upper and lower ends thereof respectively, and at each side as shown. Eye hooks 17, or similar fastening members attached to the channel irons at the position indicated serve to hold the springs in their mounted relation. Referring now to FIGURE 3, I utilize an annular end section 18 which functions both as a pallet for the cast product and as a guide in determining the thickness of the tile, as will be subsequently explained.

The annular end section 18 has a lower flange portion 19 which terminates outwardly in an interlocking connection 20 with the inner surfaces of the sections 11 at the lower flared ends 13 thereof. Such interconnection may be formed by means of an outwardly extending peripheral V-shaped margin 21 which fits into a corresponding V-shaped groove 22 formed in each of the shell halves or sections 11. An inner flange 23 forms an integral part of the annular end section 18 and defines an inner guide and bearing surface 24, as shown. A plug 25 of wood or other suitable material is temporarily secured in the opening defined by the guide and bearing surface 24 if it is desired to maintain the mold in vertical condition when the charge of cement or other settable material is placed inside the mold. It is intended that the multi-sectioned mold 10 be of cheap construction and not as heavy and strong as would be required if it constituted the only structure for retaining the cementitious material during the molding operation. The multi-sectioned mold 14 is intended to be left in surrounding relation with poured and molded cementitious material at least until the initial setting thereof, although it is contemplated that, where a rather dry mix is employed, such mold sections may be removed immediately after forming of the material.

The multi-sectioned mold is utilized in cooperation with a cage element 26 to complete a braced form indicated generally at 27, the latter being adapted to be subject to a rotary molding process as hereinafter described.

The cage 26 may constitute a plurality of elongated brace members 28, the ends of which are secured to a circumferential bearing member 29 at each end thereof. An outer annular collar 30 is utilized to center and brace the flared end 13 of the multi-sectioned mold 10 at one end while a shouldered and annularly recessed hub 31 is formed with the circumferential bearing 29 at the other end to internally hold and center the smaller end of the multi-sectioned mold 10 at the outer end thereof, as shown in FIGURE 5.

The shouldered hub 31 has an inner guide and bearing surface 32 which is in alignment with the annular opening defined by the corresponding inner guide and bearing surface or track 24 on the annular end section 18. The respective guide and bearing surfaces or tracks 24 and 32 may be of the same diameter to simplify the rolling and packing procedure hereinafter disclosed.

Abutment members 33 may be secured to, or formed with, the brace members 28 to bear against the outer surface of the multi-sectioned mold 10 at a plurality of positions, as indicated in FIGURE 4. Additional latching and bracing means may be supplied as shown at 34 in FIGURE 5. Simple L-shaped latch members may be utilized in a pivotal connection 35 with several of the brace members 28, as shown. The latch members 34 serve not only to brace the multi-sectioned mold 10 but also prevent relative rotation of the mold with respect to the cage portions.

Referring now to FIGURES 7 and 8, the mold and cage elements in mounted condition and charged with wet cementitious material has a packing roller 36 inserted into the opening within mold 10 and in the instant case, the packing roller constitutes a simple cylindrical rod having a diameter less than that of the inner guide and bearing surfaces 24 and 32. The packing roller is adapted to relatively rotate with respect to the cage and mold elements and to eventually contact the bearing surface as the cementitious materials is packed and the excess removed from the cage and mold. In order to accomplish the actual molding operation, I utilize means 37 for rotating the mold and its cage with respect to the packing roller to force outwardly and form the unset cementitious material against the inner surfaces of the mold 10. Rotating means 37 may comprise a structure 38 having spaced parallel shafts 39—41 journaled thereacross in spaced bearing members 42, as shown in FIGURES 7 and 8. Each of the shafts 39—41 is provided with a pair of spaced grooved wheels 43, one of each pair lying in coplanar relationship at one side of structure 38 and the others lying in coplanar relationship at the other side thereof. Adjacent pairs of the grooved wheels 33 thus constitute trunnions for receiving and rotating the respective circumferential bearing members 29 of each of the cage elements 26. As shown in FIGURE 7, the three shafts 39—41, together with their grooved trunnion wheels 43, accommodate two of the complete braced forms 27, together with their cementitious charges and packing rollers 36 inserted into operative position, as shown. At one side of the structure 38 each of the shafts 39—41 may be provided with a drive gear 44 which intermesh with aligned worm gears 45 respectively secured to a common shaft 46 which is journaled in bearings 47 as shown. One end of shaft 46 may extend beyond the structure 38 and have a sheave 48 secured thereto. Shaft 46 and sheave 48 are rotated by such means as V-belt 49 which, in turn, is driven by motor pulley 50 which, in turn, is secured to shaft 51 of the motor 52. Motor 52 is mounted to the structure 38 and may be powered from a normal electrical source, not shown.

In the use and operation of my apparatus, the individual sections 11 of the multi-sectioned mold 10 are placed in abutting relation and the clamp means 14 is slipped over the assembled sections to maintain them in firmly abutted and clamped relation without the use of screws, pins or other time consuming expedients. The plug 25 may be inserted in the axial opening defined by the track or bearing surface 24 in the annular end section which also is held in clamped relation by clamp means 14. A pre-weighed quantity of unset cementitious material is then placed in the mold while in the upstanding relation shown in FIGURE 3. Cage 26 is then lowered over the mold 10 and in bracing relation with the outer surface thereof. The latch members 34 are then swung inwardly to lock the mold 10 together with the cage 26, thus forming the completed braced form 27, as shown in FIGURES 4 and 5.

The braced form, together with its cementitious charge, is then brought to the rotating means 37 and circumferential bearing members 29 are placed in their respective trunnions composed of the grooved wheels 43, as previously noted. Plug 25 is then removed from the annular flange 18 and rod 36 is placed through the longitudinal opening defined by the mold 10 and the cage 26. Motor 52 is then energized to drive the shaft 46 in either direction to impart rotary motion to the trunnion elements, upon which the pair of braced forms 27 are positioned. Each of the braced forms 27 are then rotated with the packing roller or rod 36 maintaining substantially a parallel relationship with the axis of the mold and the weight thereof continuing to pack the cementitious material as the braced form 27 rotates. The cementitious material will be kneaded or otherwise forced against the inner surface of the form until the packing roller 36 comes into bearing engagement with the guide and bearing surfaces or tracks 24 and 32. Excess cementitious material will be squeezed through the open ends of the braced form and may be collected for re-use or discarded as desired. It will be noted that the packing roller 36 is biased away from the axis of the mold and toward the bearing surfaces by virtue of the weight of the roller. It is understood, of course, that the biasing force may be increased or diminished by utilizing a heavier or lighter material or by increasing the size of the packing roller. Other means for increasing the biasing force while maintaining the packing roller in rotatable condition will be obvious to those skilled in the art.

Upon completion of the molding operation, each of the packing rollers 36 is withdrawn from its respective braced form 27 and each braced form is up-ended with the flared or bell portion 13 downward upon a supporting surface. The cage 26 is then removed after latches 34 have been retracted and the clamp means 14 is subsequently removed from the sections 11 to free them from abutted relation. Each of the sections 11 is then carefully removed from the outer surface of the molded material to leave the finished or cast culvert or tile 53 in the position shown in FIGURE 9. It will be observed that the annular end sections 18 may be left as a pallet in the event the molded product 53 is not yet completely set. Thus, in the arrangement shown, two of the structural cages 26 may accommodate a large number of multi-sectioned mold elements 10. Each of the multi-sectioned mold elements, in turn, may be used with a plurality of the annular end sections 18, each of which becomes a pallet for the finished product 53.

It may thus be seen that a greater number of folded units of the class described can be produced in a given length of time with a lesser capital investment in the mold equipment. Furthermore, a better standardized product can be obtained with a lesser operational cost when employing my simple and novel apparatus.

It will, of course, be understood that various changes may be made in the form, details, arrangement and proportions of the parts without departing from the scope of my invention.

What I claim is:

1. In apparatus for molding cementitious products such as tile and culverts wherein the mold is removed from the molded product prior to the setting of the cementitious material a mold consisting of at least two elongate sections of arcuate cross section in disconnectible complementary relationship forming an annular shell, means removably connecting the abutting longitudinal edges of said sections in clamped relationship and permitting said sections to be laterally stripped from the molded product without disturbing same, said sections providing an irregular circumferentially extending inner peripheral portion adjacent one end of said mold, and a pallet member capable of being removably enclosed within and enclosing said end and having an irregular circumferential outer peripheral portion corresponding to and interfitting with the irregular portion provided by said sections to secure said pallet member within said shell adjacent one end thereof and prevent relative axial movement therebetween, said shell being removable from said pallet member only by disconnection of said sections and lateral stripping thereof from said annular pallet member to enable said sections to be stripped from the unset molded product without disturbing same while leaving set product standing on said pallet for setting of said product.

2. Apparatus for making concrete products such as tile and culverts which comprises a mold consisting of at least two elongate sections of arcuate cross section in disconnectible complementary relationship forming an annular shell, abutment members fixedly secured to and outwardly projecting from the area adjacent the longitudinal edges of said sections, removable grooved clamping elements receiving each pair of abutting abutment members within said groove and clamping said members together, tensioned spring elements extending between adjacent clamping elements and tensionally holding same in clamping position, said sections providing an irregular circumferentially extending inner peripheral portion adjacent one end of said mold, and a pallet member removably enclosed within and enclosing said end and having an irregular circumferential outer peripheral portion corresponding to and interfitting with the irregular portion provided by said sections to secure said pallet member within said shell adjacent one end thereof and prevent relative axial movement therebetween, said pallet member being removable from said shell only by disconnection of said sections and lateral stripping thereof from said annular pallet member.

3. The structure set forth in claim 1 having in combination therewith a detachable cage member enclosing and supporting said mold, said cage comprising a pair of annular collar members adjacent the ends of said mold engaging and enclosing the outer periphery thereof to center and brace said mold, each of said collars having circumferential outwardly extending bearing members, the bearing members of each collar having the same diameter, the collar adjacent the end of the annular shell opposite to the end housing the annular pallet member having an annular hub portion extending inwardly into said shell from the end thereof and snugly enclosed therewithin, the bore of said annular hub having a size corresponding to the bore of the opposed annular pallet member and co-axial therewith, and a plurality of circumferentially spaced bracing members extending between and secured to said circumferential bearing members.

4. In apparatus for molding cementitious products such as culverts and pipe wherein the mold is removed from the molded product prior to the setting of the cementitious material, a mold comprising at least two elongate shell sections adapted for disconnectable joining in complementary relationship to form an annular shell, abutment members fixedly secured to and outwardly projecting from the area adjacent the longitudinal edges of said sections, single removable longitudinally extending grooved clamping elements for fitting over each pair of abutting abutment members in close relationship thereto to secure said members therebetween, tensional resilient spring-type securing members adapted to extend between and interconnect said clamping elements and circumscribe said mold in tensioned state to hold said elements in clamping relationship with said members and hold said sections in abutting relationship, said sections being laterally removable from the molded product upon disconnection of said clamping members from the sections and prior to the setting of the molded product so as not to disturb said unset product.

5. The apparatus set forth in claim 4 including a means for removably securing said securing members to said clamping elements.

6. In apparatus for molding cementitious products and the like including a mold adapted to be rotated in relative cooperation with packing roller means to form hollow cementitious products, a mold comprising a plurality of disconnectably elongate outer shell sections, means for disconnectably joining said sections in complementary relationship to form an annular shell for enclosing the material to be molded, said sections being latterly movable with respect to the molded product when disconnected to enable said sections to be removed from the product without disturbing said product, an annular pallet member adapted for mounting within said shell adjacent one end thereof, said shell and said pallet member being provided with cooperating inter-fitting locking means preventing relative movement therebetween, said locking means being connected and disconnected only by the lateral movements of said shell sections with respect to said pallet member, and structure adjacent the other end of said shell providing an opening in actual alignment with the bore of said pallet, the surfaces defining said opening and said bore providing bearing surfaces for receiving and engaging a packer roller extending through said shell.

References Cited in the file of this patent

UNITED STATES PATENTS

| 140,734 | Sharpe | July 8, 1873 |
| 433,882 | Belding | Aug. 5, 1890 |
| 680,273 | Parker | Aug. 13, 1901 |
| 1,000,427 | Miller | Aug. 15, 1911 |
| 1,786,385 | Andrews | Dec. 23, 1930 |
| 2,008,074 | Isman | July 16, 1935 |
| 2,164,624 | Prosser | July 4, 1939 |
| 2,189,071 | Kopp | Feb. 6, 1940 |
| 2,290,951 | Duhalt | July 28, 1942 |
| 2,404,966 | Kingston | July 30, 1946 |
| 2,564,026 | Osborn | Aug. 14, 1951 |
| 2,623,260 | Jube | Dec. 30, 1952 |
| 2,671,260 | Jessen et al. | Mar. 9, 1954 |
| 2,681,494 | Weber | June 22, 1954 |
| 2,701,403 | Chanlund | Feb. 8, 1955 |
| 2,735,153 | Chanlund | Feb. 21, 1956 |

FOREIGN PATENTS

| 18,789/29 | Australia | Mar. 7, 1929 |
| 20,989/29 | Australia | Apr. 29, 1930 |